United States Patent
Shen et al.

(10) Patent No.: US 8,949,358 B2
(45) Date of Patent: Feb. 3, 2015

(54) METHOD AND SYSTEM FOR BUILDING AN ENTITY PROFILE FROM EMAIL ADDRESS AND NAME INFORMATION

(71) Applicant: Palo Alto Research Center Incorporated, Palo Alto, CA (US)

(72) Inventors: Jianqiang Shen, Santa Clara, CA (US); Oliver Brdiczka, Mountain View, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 0 days.

(21) Appl. No.: 13/660,959

(22) Filed: Oct. 25, 2012

(65) Prior Publication Data

US 2014/0122501 A1    May 1, 2014

(51) Int. Cl.
G06F 15/16    (2006.01)
(52) U.S. Cl.
USPC .......... 709/206; 707/722; 707/736; 707/758; 706/12; 706/14
(58) Field of Classification Search
None
See application file for complete search history.

(56) References Cited

U.S. PATENT DOCUMENTS

| | | | | |
|---|---|---|---|---|
| 8,495,151 | B2* | 7/2013 | Bodapati et al. | 709/206 |
| 8,725,815 | B2* | 5/2014 | Bayles et al. | 709/206 |
| 8,751,459 | B2* | 6/2014 | Chan et al. | 707/683 |
| 2004/0015715 | A1* | 1/2004 | Brown | 713/200 |
| 2008/0021890 | A1* | 1/2008 | Adelman et al. | 707/3 |
| 2010/0082758 | A1* | 4/2010 | Golan | 709/206 |
| 2010/0312837 | A1* | 12/2010 | Bodapati et al. | 709/206 |
| 2011/0072095 | A1* | 3/2011 | Havriluk | 709/206 |
| 2011/0119230 | A1* | 5/2011 | Zuber | 707/608 |
| 2011/0191340 | A1* | 8/2011 | Cort et al. | 707/732 |
| 2011/0225048 | A1 | 9/2011 | Nair | |
| 2012/0254317 | A1* | 10/2012 | Bayles et al. | 709/206 |
| 2013/0117287 | A1* | 5/2013 | Jagota et al. | 707/755 |
| 2013/0318098 | A1* | 11/2013 | Chan et al. | 707/748 |

OTHER PUBLICATIONS

Jie Tang et al., "A Combination Approach to Web User Profiling", ACM Transactions on Knowledge Discovery from Data vol. 5 No. 1, Dec. 1, 2010.
Kalashnikov, D. V. et al., "Web People Search via Connection Analysis", IEEE Transactions on Knowledge and Data Engineering, vol. 20, No. 11, Nov. 1, 2008.
Vetle I. Torvik et al., "Author Name Disambiguation in MEDLINE", ACM Transactions on Knowledge Discovery from Data, vol. 3, No. 3, Jul. 1, 2009.
Terence Chen et al., "Is More Always Merrier? A Deep Dive Into Online Social Footprints", ACM Workshop on Online Social Networks, New York, Aug. 17, 2012.

* cited by examiner

*Primary Examiner* — Hung Le
(74) *Attorney, Agent, or Firm* — Shun Yao; Park, Vaughan, Fleming & Dowler LLP

(57) ABSTRACT

An entity-profiling system obtains an electronic identifier for a target entity, such as an email address at which the target entity can be reached, and parses the electronic identifier to determine a name for the target entity. The system also parses the electronic identifier to determine a domain with which the target entity is associated. The system then obtains one or more Internet web pages associated with the target entity based on the entity's name and the domain, and generates a profile for the target entity based on the obtained Internet web pages.

19 Claims, 8 Drawing Sheets

METHOD AND SYSTEM FOR BUILDING AN ENTITY PROFILE FROM EMAIL ADDRESS AND NAME INFORMATION

RELATED APPLICATION

The subject matter of this application is related to the subject matter of the following applications:

U.S. patent application Ser. No. 13/663,747, entitled "METHOD AND SYSTEM FOR PSYCHOLOGICAL ANALYSIS BY FUSING MULTIPLE-VIEW PREDICTIONS," by inventors Jianqiang Shen and Oliver Brdiczka, filed Oct. 30, 2012; and U.S. patent application Ser. No. 13/867,991, entitled "METHOD AND SYSTEM FOR CUSTOMIZING A CONVERSATION AGENT BASED ON A USER'S CHARACTERISTICS," by inventors Jianqiang Shen and Oliver Brdiczka, filed Apr. 22, 2013;

the disclosures of which are incorporated by reference in their entirety herein.

BACKGROUND

1. Field

This disclosure is generally related to automatically generating a profile for a target entity. More specifically, this disclosure is related to obtaining public documents from one or more target websites based on an entity's electronic identifier.

2. Related Art

Emails have become a popular personal and business communication tool. Oftentimes, meeting invitations are initialized with emails, as one person sends an email to one or more others to suggest a meeting time and a location. It is advantageous for each member of the meeting to know more about the others that he is going to meet before the meeting takes place. However, a recipient of the email may not know the sender personally, which may place him at a disadvantage during the meeting.

Some organizations, such as insurance agencies, may store information pertaining to each client's account history. When an agent is to meet with an existing client, the agent can review the client's account history to obtain a snapshot of the customer's previous needs and his interactions with other agents. Unfortunately, this client information only exists for existing clients, which places the agent at a disadvantage when meeting with a new client.

Further, in many business situations, a person may not have background information for others within an email list. If this person desires to learn more about the others, he may need to try using a search engine to find information about each of the others in the email list. Unfortunately, search engines typically provide a large number of search results that are not relevant when the person being searched for is not a celebrity figure. To make matters worse, when the email list includes a large list of meeting attendees, the email recipient can easily become overwhelmed while reading through the search results for each of these attendees.

SUMMARY

One embodiment provides a system that obtains an electronic identifier for a target entity, such as an email address at which the target entity can be reached. The system parses the electronic identifier to determine an entity identifier for the target entity, and to determine a domain with which the target entity is associated. The entity identifier can indicate, for example, a name associated with the target entity. The system then obtains one or more Internet web pages associated with the target entity based on the entity identifier and the domain, and generates a profile for the target entity based on the obtained Internet web pages.

In some embodiments, while obtaining the one or more Internet web pages, the system determines whether the domain matches a blacklisted domain. If the domain does not match a blacklisted domain, the system can obtain one or more Internet web pages associated with the domain, and selects a web page from the domain that includes the entity identifier.

In some embodiments, while obtaining the one or more Internet web pages, the system performs a search for a plurality of Internet web pages that include the electronic identifier, and selects a web page associated with a domain from a predetermined list of target domains.

In some embodiments, the electronic identifier includes an email address. While determining the name identifier, the system parses the local part of the email address to identify a person's name. Further, while determining the domain, the system parses the domain part of the email address to identify a name of an organization.

In some embodiments, while obtaining the one or more Internet web pages, the system generates a search query based on the person's name and the organization's name, and performs a search for a plurality of Internet web pages that satisfy the search query. The system then selects, from a subset of the Internet web pages, a web page associated with a domain from a predetermined list of target domains.

In some embodiments, while parsing the local part of the email address, the system can select a substring before a period to obtain a first name, and/or can select a substring after a period to obtain a last name. Further, the system can remove a trailing character to obtain a first name, and/or can remove a leading character to obtain a last name.

In some embodiments, while generating the profile, the system determines a plurality of features for the target entity using information from the obtained Web pages, generates a score for one or more behavior characteristics based on the identified features. The system also updates a profile for the target entity based on the scores for the behavior characteristics.

In some embodiments, the system can present to a user a user interface (UI) that includes time-related profile information from the target entity's profile. The UI can allow the user to view changes in the target entity's behavior-characteristics over time.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention solve the problem of generating an entity profile for a target entity based on knowledge of the entity's electronic identifier, such as an email address. For example, when the user receives an email requesting a meeting with various other people, the system can use an email address for each other person in the email list to gather content about the person, and to generate a profile that indicates the person's biography, demographic, and personality profile. The system can organize the information in each person's profile, and can present to the user a user interface (UI) that includes a person's profile information in a categorized form.

Figure 1:
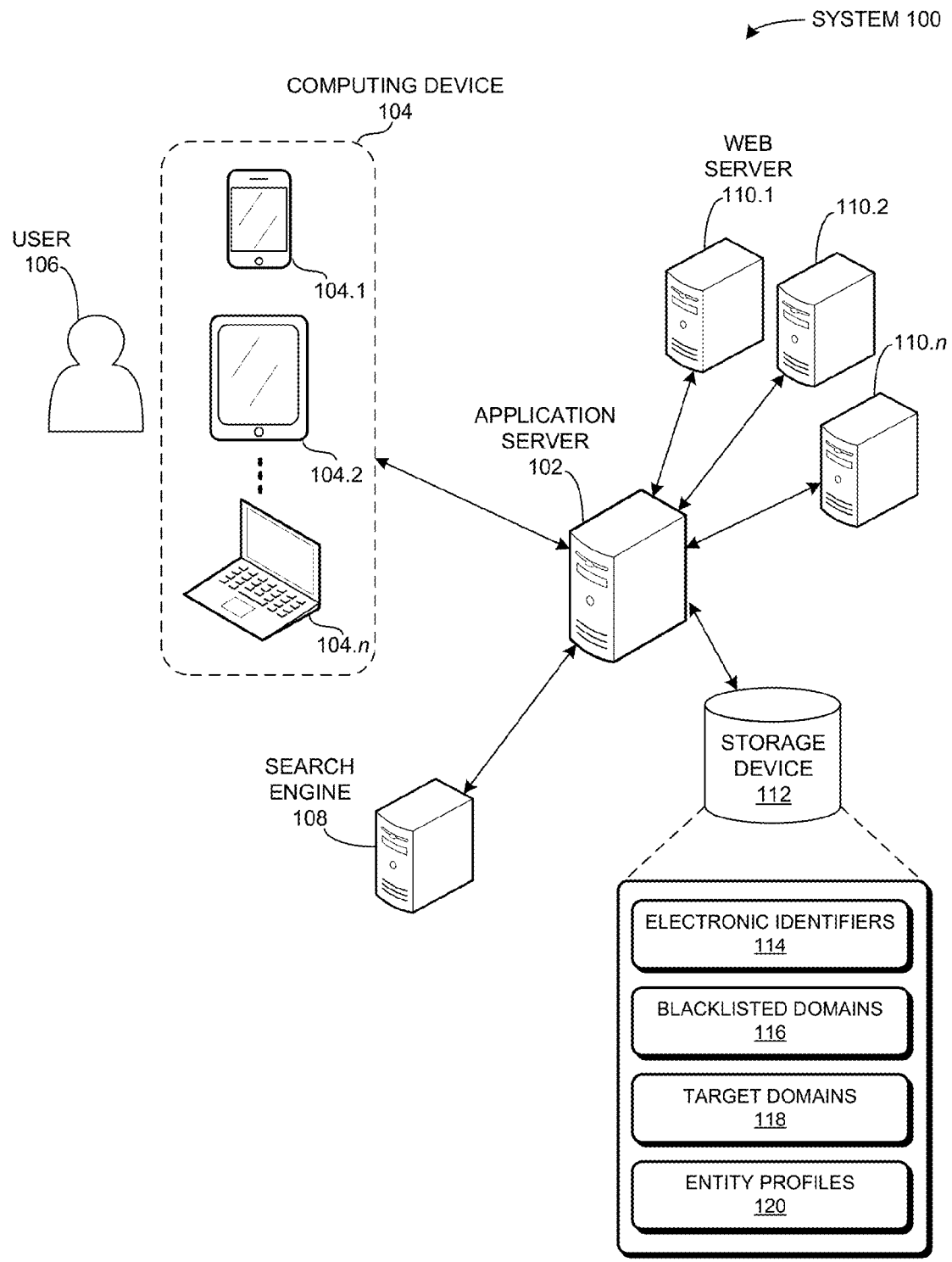
FIG. 1 illustrates an exemplary computer system that facilitates generating a profile for a target entity in accordance with an embodiment.

FIG. 1 illustrates an exemplary computer system 100 that facilitates generating a profile for a target entity in accordance with an embodiment. Computer system 100 can include an application server 102 that can generate a profile for a target entity. Computer system 100 can also include a search engine 108 and a plurality of web servers 110, which application server 102 can use to generate or update the entity's profile. Further, computer system 100 can include a computer network, which can include any wired or wireless network that interfaces various computing devices to each other, such as a computer network implemented via one or more technologies (e.g., Wi-Fi, cellular, Ethernet, fiber-optic, Bluetooth, etc.). For example, the computer network can interface application server 102 to computing device 104, search engine 108, and web servers 110.

Computer system 100 can also include a computing device 104 coupled to the network and associated with a user 106, such as a portable computing device that user 106 can travel with, use to communicate with others, perform tasks, schedule meetings, and interact with application server 102. For example, computing device 104 can include a smartphone 104.1, a tablet computer 104.2, or any other personal computing device 104.n such as a laptop computer, a desktop computer, etc.

When user 106 schedules a meeting, user 106 can use computing device 104 to send a request to application server 102 for obtaining information about one or more target entities based on each entity's email address. Application server 102 can issue one or more search queries to search engine 108, based on the email address, to obtain web pages (e.g., from web servers 110) that provide background information on the target entity. Application server 102 can obtain these web pages from web servers 110, which can include social-media websites (e.g., Twitter, Facebook, LinkedIn, Flickr, etc.), employer websites, Internet forums, etc. Further, application server 102 can process the content of these web pages to determine key features of the target entity (raw data pertaining to the target entity), and to determine personal characteristics of the target entity (an interpretation of the features obtained for target entity).

In some embodiments, application server 102 can include a mainframe computer that manages entity profiles for a plurality of target entities. For example, an insurance agency or an employment agency may wish to keep track of changes to a person's life, including biographical and emotional changes. The insurance agency may have some information for these entities within a local database, but may use public electronic identifiers associated with these entities (e.g., their email addresses) to obtain and deduce additional personal information for these entities.

In some embodiments, computing device 104 can include or be coupled to a storage device 112, which can store electronic identifiers 114, blacklisted domains 116, target domains 118, and entity profiles 120. Electronic identifiers 114 can include any online handle that can be used to communicate with a target entity or obtain information regarding the target entity (e.g., an email address, a Twitter handle, etc.). Blacklisted domains can include a set of website domains that are known to not provide useful information about a target entity, such as email services that are available to anyone for free or for a fee (e.g., Gmail, Hotmail, 1and1, etc.). On the other hand, target domains 118 can include a set of website domains that are known to include valuable personal information that facilitates generating or updated an entity's personal profile.

Entity profiles 120 can include profiles that have been generated for one or more target entities. Each entity profile can include information that was directly obtained for a target entity from websites accessible via one or more of target domains 118 (e.g., features), and can include personal information that is interpreted from the target entity's features (e.g., personality characteristics). Further, each profile can categorize an entity's features and characteristics into one or more profile categories, which facilitates automatically generating a visual representation of the entity's profile for display on computing device 104.

Figure 2:
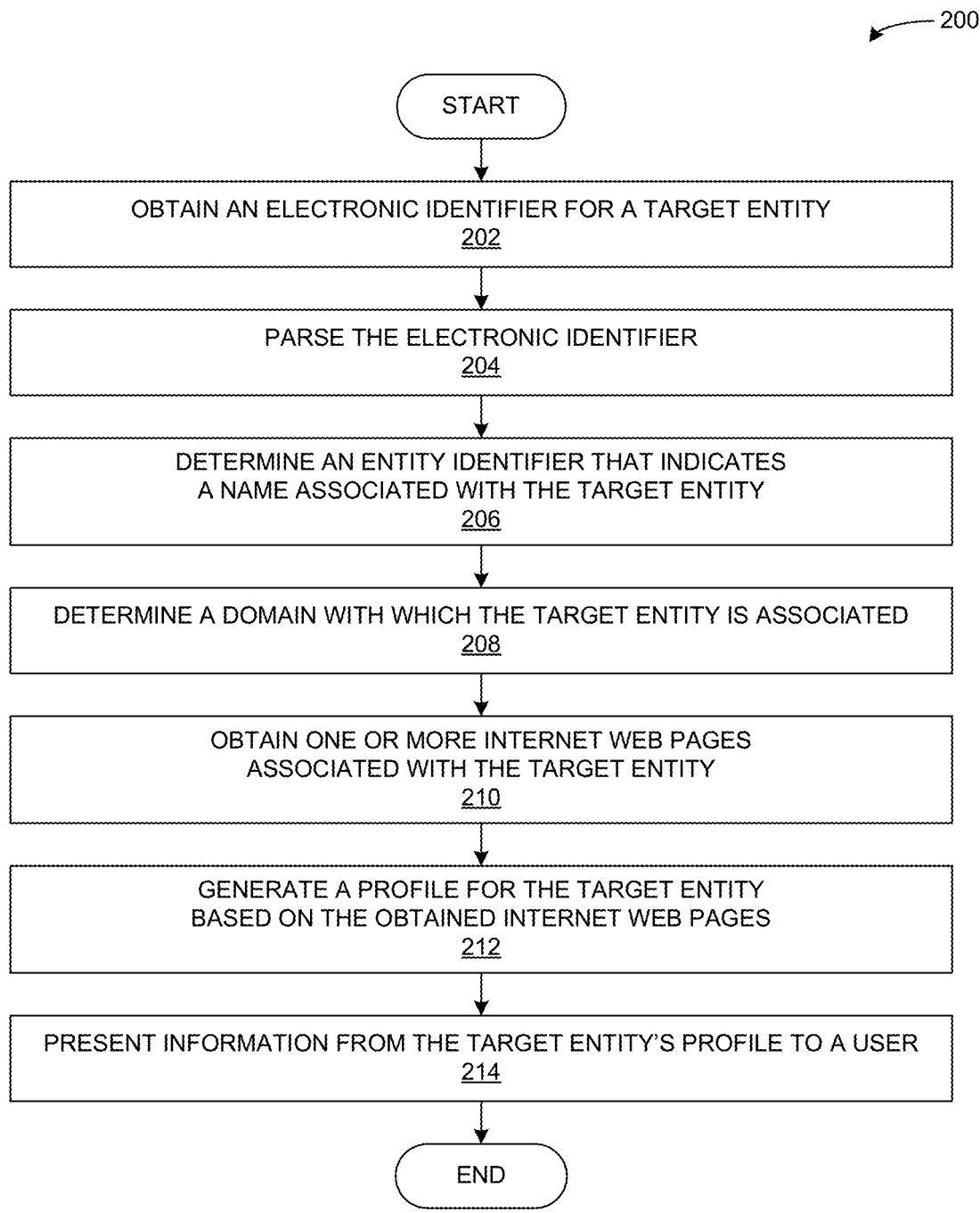
FIG. 2 presents a flow chart illustrating a method for generating and presenting a profile for a target entity in accordance with an embodiment.

FIG. 2 presents a flow chart illustrating a method 200 for generating and presenting a profile for a target entity in accordance with an embodiment. During operation, the system can obtain an electronic identifier for a target entity (operation 202). In some embodiments, the electronic identifier can include an email address. The email address has a format X@Y, such that X includes a local part of the email address, and Y includes a domain part of the email address.

The system then parses the electronic identifier (204), and determines an entity identifier that indicates a name associated with the target entity (operation 206). If the electronic identifier is an email address, the entity identifier can include the local part of the email address. Oftentimes, if an email address is issued by an employer or a university, the email address may be generated from the user's first name and/or last name using a predetermined pattern. Thus, the entity identifier can include a first name and/or a last name for the target entity. However, at other times, the entity identifier can include an online handle that was selected by the target entity, but which does not include any part of the entity's name.

The system can also determine a domain with which the target entity is associated (operation 208). If the electronic identifier is an email address, the determined domain can include the domain part of the email address. Oftentimes, the domain can include an organization to which the entity belongs, such as an employer, a university, a professional society, etc. The system can use this information to refine the content that is obtained based on the target entity's electronic identifier. However, at other times, the domain can include an online service that anyone can subscribe to, such as the Gmail email service (provided by Google Inc. of Mountain View, Calif.) or the Hotmail email service (provided by Microsoft Inc. of Redmond, Wash.). In this case, the domain part of the electronic identifier does not provide additional information that can be used to refine the content that is obtained for the target entity.

The system can then obtain one or more Internet web pages associated with the target entity (operation 210), for example, by generating and issuing a search-engine query based on an email address, the entity identifier, and/or the domain. The system can also obtain content for the target entity using an internal database of entity data (e.g., a database of historical data for a set of business clients, and communications with these clients). The system then generates a profile for the target entity based on the obtained Internet web pages (operation 212), and can present the information from the target entity's profile to a user (operation 214).

Figure 3:
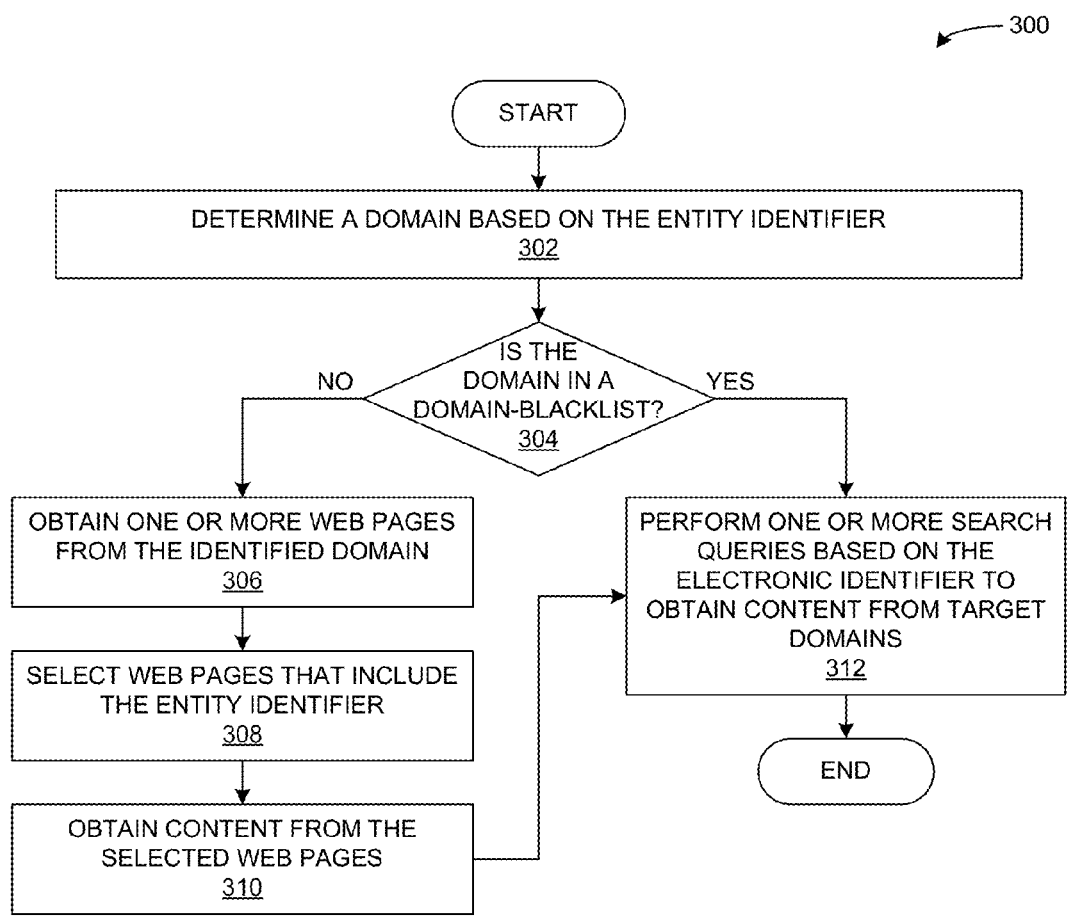
FIG. 3 presents a flow chart illustrating a method for obtaining content associated with the target entity in accordance with an embodiment.

FIG. 3 presents a flow chart illustrating a method 300 for obtaining content associated with the target entity in accordance with an embodiment. During operation, the system can determine a domain based on the entity identifier (operation 302), and determines whether the domain is included in a domain blacklist (operation 304). The domain blacklist can include a set of Internet domain names that may not provide useful information about a user. As was mentioned above, an email address domain that belongs to a public email service does not provide useful information about any organizations that the user is associated with.

If the system determines that the domain is not a blacklisted domain, the system obtains one or more web pages from the identified domain (operation 306). In some embodiments, the system obtains employee-related or member-related web pages from the domain (e.g., a "Team" page, an "About" page, a "People" page, etc.). As another example, the system can use an Internet search engine to search web pages from only the desired domain. The system then selects web pages that include the entity identifier (operation 308), and obtains content from the selected web pages (operation 310). In some embodiments, if the domain is a local domain (e.g., the entity-profiling system is operated by an organization associated with the target domain), the system may have access to internal data regarding members of the organization. Thus, the system can obtain, from the internal database, data and user-generated content that is associated with the entity. This content and data can include email communications to/from the entity, a resume or biography for the entity, projects that the entity is working on and/or has completed, etc.

The system then proceeds to obtain additional web pages by performing one or more Internet search queries based on the electronic identifier to obtain content from the target domain (operation 312). Note that, if the system determines during operation 304 that the domain from the entity's electronic identifier (e.g., email address) is a blacklisted domain, the system can proceed to perform the one or more Internet search queries without first obtaining content from the domain.

Figure 4:
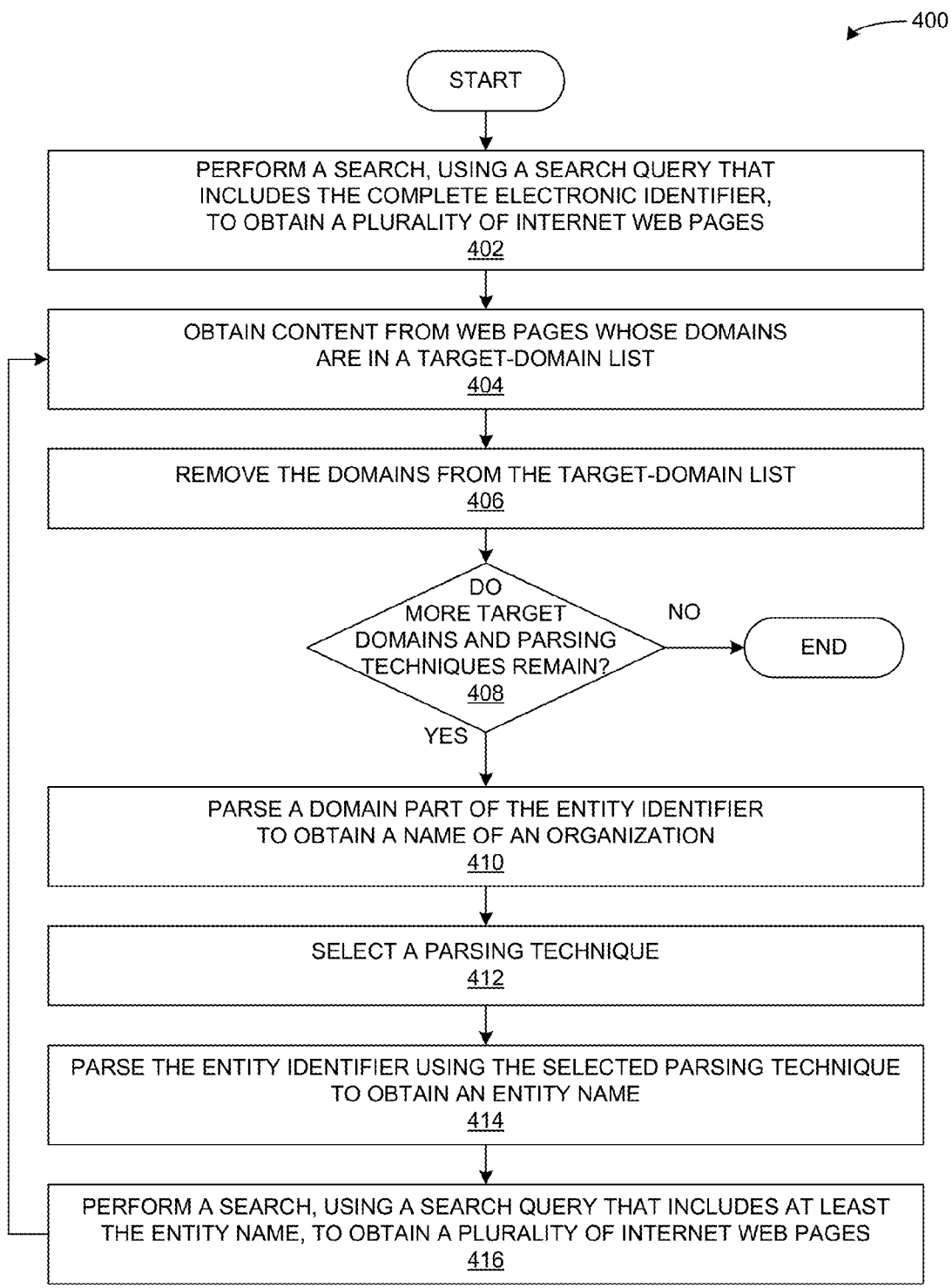
FIG. 4 presents a flow chart illustrating a method for performing one or more Internet search queries to obtain content from a set of target website domains in accordance with an embodiment.

FIG. 4 presents a flow chart illustrating a method 400 for performing one or more Internet search queries to obtain content from a set of target website domains in accordance with an embodiment. During operation, the system can perform one of the search iterations (e.g., during the first search query) by generating a search query that includes the full electronic identifier (e.g., the target entity's full email address). The system can perform a search operation, using an Internet search engine to process the search query, to obtain a set of Internet web pages (operation 402). These search results may include discussion forums or any web page to which the user has contributed content, or they may include web pages that mention topics or events to which the target entity has been associated with in the past. These search results may also include social-media websites to which the user has subscribed using the electronic identifier.

Recall that the system uses a predetermined target-domain list (e.g., a set of whitelisted domains) to select search results that are likely to include information about a person. The target-domain list can include domains for websites that include detailed personal information about a plurality of individuals, such as twitter.com, facebook.com, linkedin.com, crunchbase.com, youtube.com, flicker.com, etc. Thus, the system obtains content from the web pages, of the search results, whose domains are in the target-domain list (operation 404). In some embodiments, the system only obtains content from matching websites that appear within the top n search results, such as the top 20 matching web pages. The system also removes the domains for these web pages from the target-domain list (operation 406), which prevents the same web pages being stored during different search iterations.

Once the system has completed an iteration, the system determines whether more parsing techniques and target domains remain (operation 408). If there are no more domains in the target-domain list, or there are no more parsing techniques to try, the system can proceed to generate or update a profile for the target entity using information from the obtained web pages. However, if more target domains remain and the system has not tried all parsing techniques, the system can proceed to parse a domain part of the entity identifier (e.g., an email address) to obtain a name of an organization (operation 410). For example, the system can use the domain as the name of the organization (e.g., the second-level domain "dell" from the domain part "dell.com" indicates the computer company "Dell"). As another example, the system can use the domain to determine the name of the organization (e.g., the domain "bofa.com" indicates the banking company "Bank of America"). The system can obtain the organization's name by visiting a main webpage from the domain, or submitting a search query that includes the domain into an Internet search engine and selecting a name with a high occurrence.

In some embodiments, the system can try parsing the local part of the electronic identifier using a different parsing technique for each search iteration to determine the target entity's name. Doing so allows the system to automatically identify the target entity's name from an email address if possible, without requiring the end user to provide the target entity's name.

TABLE 1

List of Parsing Strategies

| | Email Address Structure | Parsing Technique |
|---|---|---|
| I | john.doe@parc.com | Select a substring before a period to obtain a first name. Select a substring after a period to obtain a last name. |

TABLE 1-continued

List of Parsing Strategies

| | Email Address Structure | Parsing Technique |
|---|---|---|
| II | jdoe@parc.com | Remove a leading character to obtain a last name. |
| III | johnd@parc.com | Remove a trailing character to obtain a first name. |
| IV | doe@parc.com john@parc.com | Select the full local part to obtain a first name or a last name. |

Table 1 presents a list of possible name-parsing techniques for determining an entity's name in accordance with an embodiment. In some embodiments, the system iterates through the list of parsing techniques (using one parsing technique per search iteration) in the order presented in Table 1. In some other embodiments, the system iterates through the list of parsing techniques in any order.

To perform a search iteration, the system selects a parsing technique (operation 412), and parses the entity identifier using the selected parsing technique to obtain an entity name (operation 414). Using the example from Table 1, the entity name can include the first name "John" and/or the last name "Doe." The system then generates a search query that includes at least the entity name, and performs a search using the generated query to obtain a plurality of Internet web pages (operation 416). The system then returns to operation 404 to obtain content from any returned pages that are associated with a target domain.

In some embodiments, if the domain is not a blacklisted domain (e.g., the domain may provide useful information about the entity), the system generates the search query during operation 416 to include the entity name as well as the domain. For example, if the email address has a structure as presented in row (I) of Table 1, the system can generate the search query to include "John," "Doe," and "PARC." However, if the domain is a blacklisted domain, the system can generate the search query to only include the entity name (e.g., "John," and "Doe").

In some further embodiments, if the entity name from operation 414 includes only a first name or a last name, and the domain is a blacklisted domain, the system may skip the current parsing technique and return to operation 408. For example, parsing techniques II-IV may only include a first name or a last name for the target entity, which by itself does not provide valuable information about the target entity. Thus, if the search query does not include a domain for a company or organization to which the entity is affiliated, the search results are likely to include information about many other individuals but not of the target entity.

Figure 5:
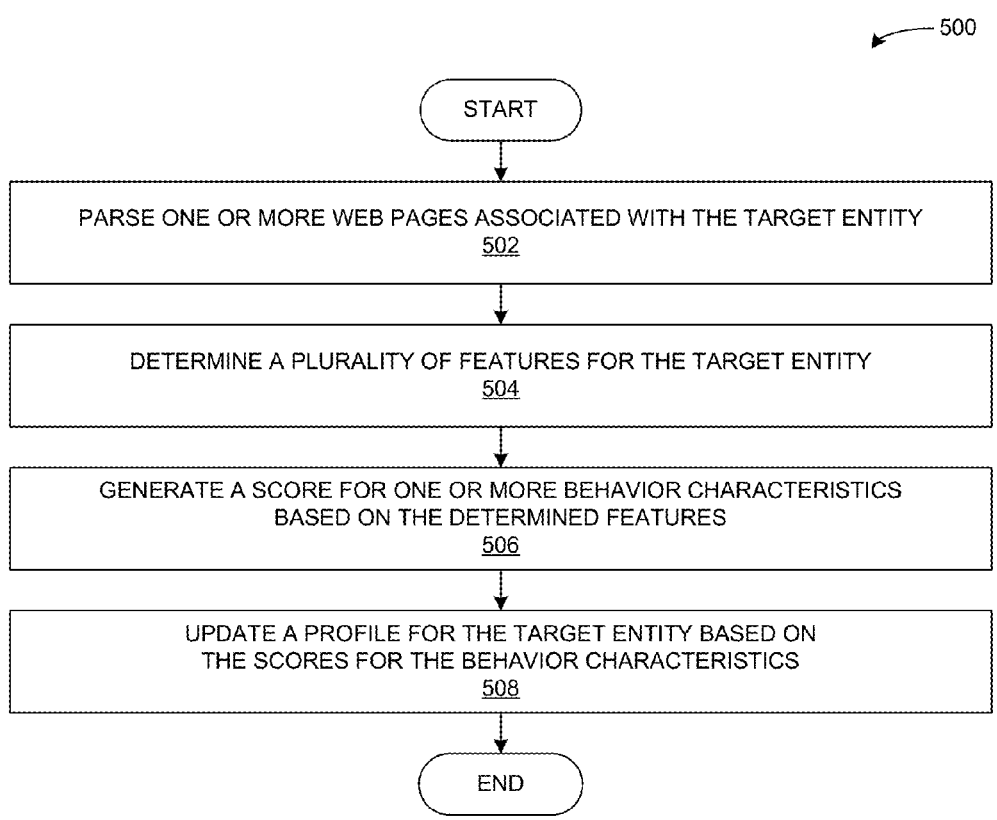
FIG. 5 presents a flow chart illustrating a method for updating the target entity's profile in accordance with an embodiment.

FIG. 5 presents a flow chart illustrating a method 500 for updating the target entity's profile in accordance with an embodiment. During operation, the system parses one or more web pages associated with the target entity (operation 502), and determines a plurality of features for the target entity (operation 504). These features can include low-level features (e.g., un-interpreted features) about the entity's behavior patterns, and other raw data about the target entity. For example, the features can include the entity's name and age, photos and videos of the entity, background information on the entity (e.g., residence, employment history, education history, comments made by the entity, etc.).

The system then generates a score for one or more behavior characteristics for the target entity based on the determined features (operation 506). In some embodiments, the scores for the behavior characteristics provide an interpretation to the target entity's personality and/or possible future behavior. Some example characteristics include scores measuring a level of extraversion, agreeableness, conscientiousness, neuroticism, openness, and emotion.

The system then generates or updates a profile for the target entity based on the scores for the behavior characteristics (operation 508). The profile can include a plurality of the entity's detected features, as well as a plurality of behavior characteristics that the system has determined about the entity. In some embodiments, the profile includes the features and behavior characteristics that the system has aggregated and categorized into a collection of useful information. The system can present data about the target entity to the end-user within one or more categories of a user interface by accessing the aggregated data based on their attributed categories.

Figure 6:
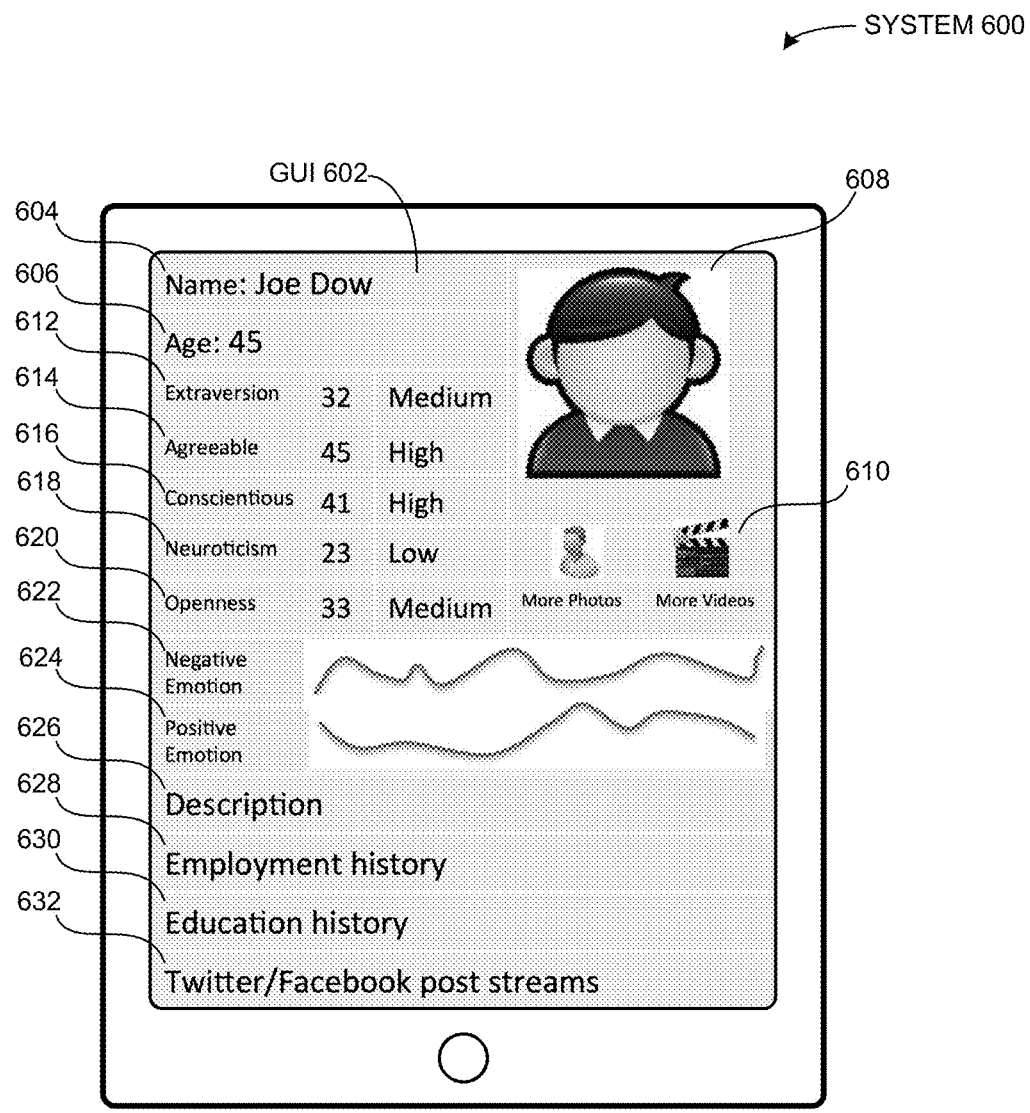
FIG. 6 illustrates a graphical user interface for presenting a target entity's profile in accordance with an embodiment.

FIG. 6 illustrates a graphical user interface 602 within a client device 600 that presents a target entity's profile in accordance with an embodiment. Specifically, GUI 602 presents a profile for the target entity that was generated from content gathered based on the entity's electronic identifier.

The personality profile can include some features (e.g., un-interpreted data) that have been discovered for the entity, such as a full name 604, an age 606, photos 608 and/or videos 610 of the entity, a home address or city, an employment history 628, an education history 630, etc. The personality profile can also include other raw user-generated content (UGC) that was created by the target entity, such as comments made through a social-media venue (e.g., a Twitter and/or a Facebook post stream 632).

The personality profile can also include the personality and behavior characteristics that have been determined for the target entity, such as an extraversion score 612 (e.g., a low score signifying the entity as introverted), an agreeable score 614 (e.g., a low score signifying the entity as disagreeable), and a conscientious score 616 (e.g., a low score signifying the entity as inconsiderate or unreliable). Other examples can include a neuroticism score 618 (e.g., a high score indicating neurotic behavior), and an openness score 620 (e.g., a high score indicating that the entity is open, while a low score indicates the entity is shy or secretive).

The personality and behavior characteristics can also include a negative emotion trend 622 and a positive emotion trend 624 for the target entity. In some embodiments, trends 622 and 624 can include a graph of the entity's mood trends over time, as determined based on time-specific data that was obtained about the entity. For example, the user may frequently write time-stamped comments on message boards and/or social-media websites. If the entity has gone through a difficult emotional period (e.g., ended a relationship or lost a job), the target entity is likely to write comments during this time period that that may sound negative, as the entity seeks emotional support. Also, if the entity has gone through an uplifting period (e.g., has received emotional support from friends or experienced career successes), the entity is likely to write comments during this time period that sound positive.

The system can interpret the mood of these comments over time to determine how the target entity's mood has changed over time, and can present an amount of positive and negative emotion that is detected from the entity's comments over time. It is possible that the user may write both positive and negative comments at any point in time (e.g., presenting a different mood via different online websites). While seeking new employment, the entity may write negative-sounding comments via a friend-themed online social network as a way to seek emotional support from friends (e.g., Twitter or Facebook). At the same time, the entity may try to sound positive and extroverted while engaged in career-themed websites (e.g., Linked-in). Thus, the system can present a timeline for both negative emotion trend 622 and positive emotion trend 624.

The personality profile can also include a description 626 of the target entity, as determined based on the target entity's features and attributes. The description can include general information, such as the entity's past achievements, organizations to which the entity is associated, and/or a diagnosis of the entity's behavior and personal motivations.

Figure 7:
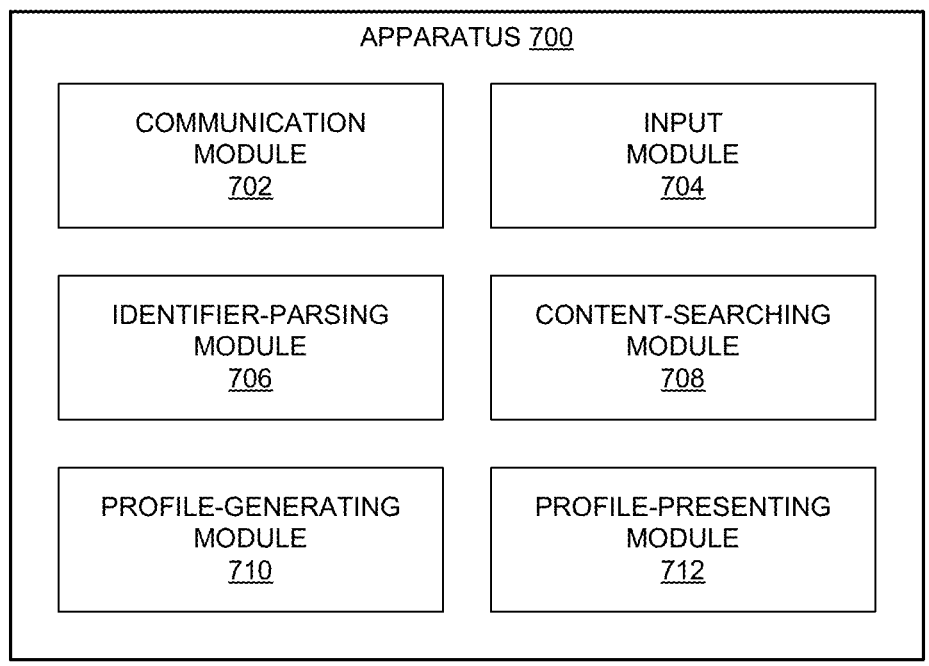
FIG. 7 illustrates an exemplary apparatus that facilitates generating a profile for a target entity in accordance with an embodiment.

FIG. 7 illustrates an exemplary apparatus 700 that facilitates generating a profile for a target entity in accordance with an embodiment. Apparatus 700 can comprise a plurality of modules which may communicate with one another via a wired or wireless communication channel. Apparatus 700 may be realized using one or more integrated circuits, and may include fewer or more modules than those shown in FIG. 7. Further, apparatus 700 may be integrated in a computer system, or realized as a separate device which is capable of communicating with other computer systems and/or devices. Specifically, apparatus 700 can comprise a communication module 702, an input module 704, an identifier-parsing module 706, a content-searching module 708, a profile-generating module 710, and a profile-presenting module 712.

In some embodiments, communication module 702 can communicate with one or more websites or client devices (e.g., a search engine, a content website, and/or an end-user's client device). Input module 704 can obtain, from the end-user, an electronic identifier for a target entity. Identifier-parsing module 706 can determine, from the electronic identifier, an entity identifier for the target entity, and a domain with which the target entity is associated. Content-searching module 708 can obtain one or more Internet web pages associated with the target entity based on the entity identifier and the domain.

Profile-generating module 706 can generate or update a profile for the target entity based on the obtained Internet web pages. Profile-presenting module 708 can present the profile to the end-user.

Figure 8:
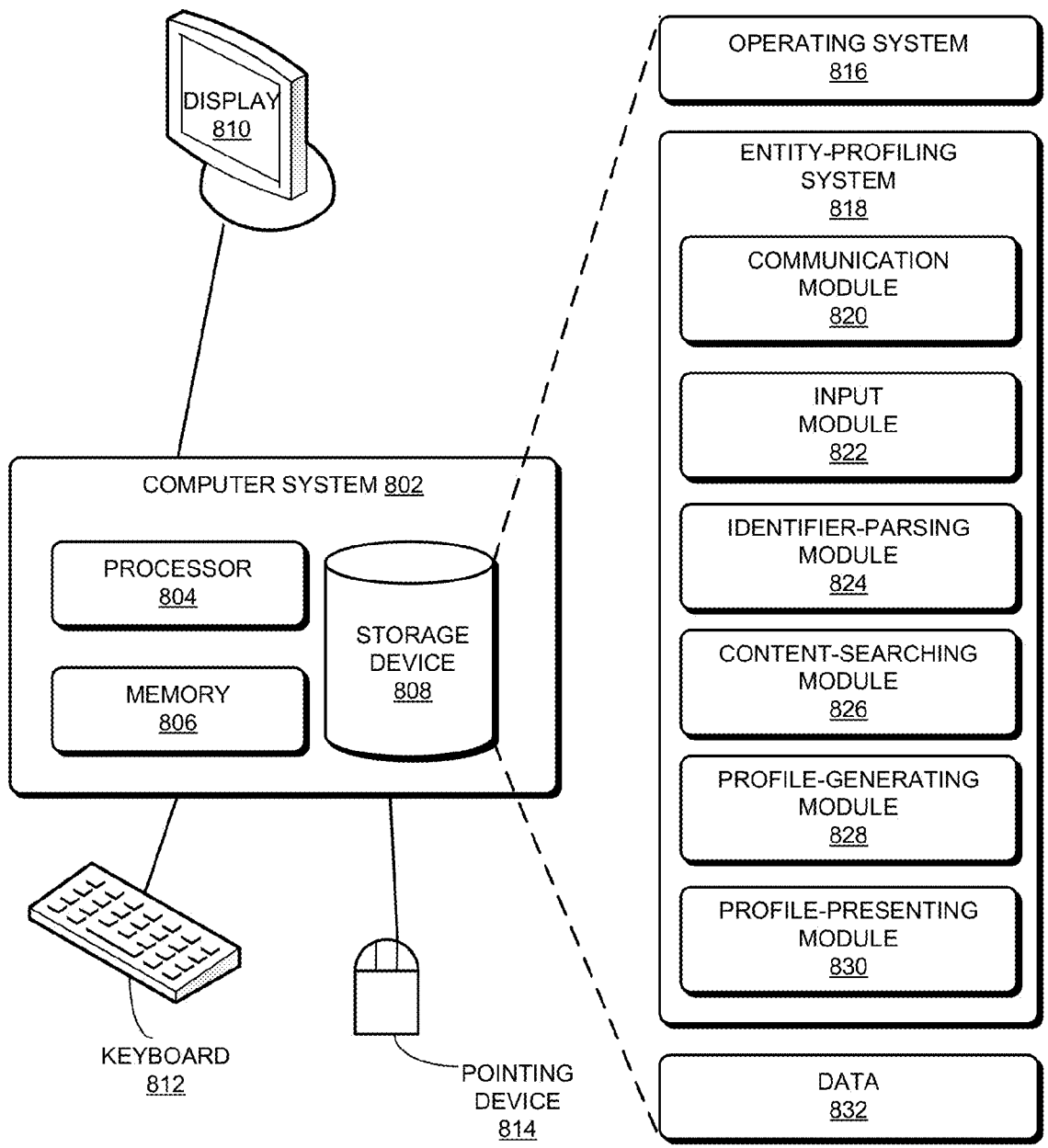
FIG. 8 illustrates an exemplary computer system that facilitates generating a profile for a target entity in accordance with an embodiment.

FIG. 8 illustrates an exemplary computer system 802 that facilitates generating a profile for a target entity in accordance with an embodiment. Computer system 802 includes a processor 804, a memory 806, and a storage device 808. Memory 806 can include a volatile memory (e.g., RAM) that serves as a managed memory, and can be used to store one or more memory pools. Furthermore, computer system 802 can be coupled to a display device 810, a keyboard 812, and a pointing device 814. Storage device 808 can store operating system 816, an entity-profiling system 818, and data 832.

Entity-profiling system 818 can include instructions, which when executed by computer system 802, can cause computer system 802 to perform methods and/or processes described in this disclosure. Specifically, entity-profiling system 818 may include instructions for communicating with one or more websites or client devices (communication module 820). Further, entity-profiling system 818 can include instructions for obtaining, from the end-user, an electronic identifier for a target entity (input module 822). Entity-profiling system 818 can include instructions for determining, from the electronic identifier, an entity identifier for the target entity, and a domain with which the target entity is associated (identifier-parsing module 824). Entity-profiling system 818 can also include instructions for obtaining one or more Internet web pages associated with the target entity based on the entity identifier and the domain (content-searching module 826).

Entity-profiling system 818 can include instructions for generating or updating a profile for the target entity based on the obtained Internet web pages (profile-generating module 828). Entity-profiling system 818 can also include instructions for presenting the profile to the end-user (profile-presenting module 830).

Data 832 can include any data that is required as input or that is generated as output by the methods and/or processes described in this disclosure. Specifically, data 832 can store at least an electronic identifier, a set of blacklisted domains, a set of target domains, and an entity profile.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method, comprising:
   obtaining, by a computing device, an electronic identifier for a target entity;
   determining, from the electronic identifier, an entity identifier for the target entity, wherein the entity identifier indicates a name associated with the target entity;
   determining, from the electronic identifier, a domain with which the target entity is associated;
   obtaining one or more Internet web pages associated with the target entity based on the entity identifier and the domain, which comprises:
      determining whether the domain matches a blacklisted domain; and
      responsive to determining that the domain does not match a blacklisted domain:
         obtaining one or more Internet web pages associated with the domain; and
         selecting a web page from the domain that includes the entity identifier; and
   generating a profile for the target entity based on the obtained Internet web pages.

2. The method of claim 1, wherein obtaining the one or more Internet web pages involves:
 performing a search for a plurality of Internet web pages that include the electronic identifier;
 selecting, from a subset of the Internet web pages, a web page associated with a domain from a predetermined list of target domains.

3. The method of claim 1, wherein the electronic identifier includes an email address;
 wherein determining the name identifier involves parsing the local part of the email address to identify a person's name; and
 wherein determining the domain involves parsing the domain part of the email address to identify a name of an organization.

4. The method of claim 3, wherein obtaining the one or more Internet web pages involves:
 generating a search query based on the person's name and the organization's name;
 performing a search for a plurality of Internet web pages that satisfy the search query; and
 selecting, from a subset of the Internet web pages, a web page associated with a domain from a predetermined list of target domains.

5. The method of claim 3, wherein parsing the local part of the email address involves one or more of:
 selecting a substring before a period to obtain a first name;
 selecting a substring after a period to obtain a last name;
 removing a trailing character to obtain a first name; and
 removing a leading character to obtain a last name.

6. The method of claim 3, wherein generating the profile involves:
 determining a plurality of features for the target entity using information from the obtained Web pages;
 generating a score for one or more behavior characteristics based on the identified features; and
 updating a profile for the target entity based on the scores for the behavior characteristics.

7. The method of claim 1, further comprising:
 presenting, to a user, a user interface that includes time-related profile information from the target entity's profile, wherein the user interface allows the user to view changes in the target entity's behavior characteristics over time.

8. A non-transitory computer-readable storage medium storing instructions that when executed by a computer cause the computer to perform a method, the method comprising:
 obtaining an electronic identifier for a target entity;
 determining, from the electronic identifier, an entity identifier for the target entity, wherein the entity identifier indicates a name associated with the target entity;
 determining, from the electronic identifier, a domain with which the target entity is associated;
 obtaining one or more Internet web pages associated with the target entity based on the entity identifier and the domain, which comprises:
  determining whether the domain matches a blacklisted domain; and
  responsive to determining that the domain does not match a blacklisted domain:
   obtaining one or more Internet web pages associated with the domain; and
   selecting a web page from the domain that includes the entity identifier; and
 generating a profile for the target entity based on the obtained Internet web pages.

9. The storage medium of claim 8, wherein obtaining the one or more Internet web pages involves:
 performing a search for a plurality of Internet web pages that include the electronic identifier;
 selecting, from a subset of the Internet web pages, a web page associated with a domain from a predetermined list of target domains.

10. The storage medium of claim 8, wherein the electronic identifier includes an email address;
 wherein determining the name identifier involves parsing the local part of the email address to identify a person's name; and
 wherein determining the domain involves parsing the domain part of the email address to identify a name of an organization.

11. The storage medium of claim 10, wherein obtaining the one or more Internet web pages involves:
 generating a search query based on the person's name and the organization's name;
 performing a search for a plurality of Internet web pages that satisfy the search query; and
 selecting, from a subset of the Internet web pages, a web page associated with a domain from a predetermined list of target domains.

12. The storage medium of claim 10, wherein parsing the local part of the email address involves one or more of:
 selecting a substring before a period to obtain a first name;
 selecting a substring after a period to obtain a last name;
 removing a trailing character to obtain a first name; and
 removing a leading character to obtain a last name.

13. The storage medium of claim 10, wherein generating the profile involves:
 determining a plurality of features for the target entity using information from the obtained Web pages;
 generating a score for one or more behavior characteristics based on the identified features; and
 updating a profile for the target entity based on the scores for the behavior characteristics.

14. An apparatus, comprising:
 an input module to obtain an electronic identifier for a target entity;
 an identifier-parsing module to determine, from the electronic identifier, one or more of:
  an entity identifier for the target entity, wherein the entity identifier indicates a name associated with the target entity; and
  a domain with which the target entity is associated;
 a content-searching module to obtain one or more Internet web pages associated with the target entity based on the entity identifier and the domain, further configured to:
  determine whether the domain matches a blacklisted domain; and
  responsive to determining that the domain does not match a blacklisted domain:
   obtain one or more Internet web pages associated with the domain; and
   select a web page from the domain that includes the entity identifier; and
 a profile-generating module to generate a profile for the target entity based on the obtained Internet web pages.

15. The apparatus of claim 14, wherein while obtaining the one or more Internet web pages, the content-searching module is further configured to:
 perform a search for a plurality of Internet web pages that include the electronic identifier;

select, from a subset of the Internet web pages, a web page associated with a domain from a predetermined list of target domains.

16. The apparatus of claim 14, wherein the electronic identifier includes an email address;

wherein while determining the name identifier, the identifier-parsing module is further configured to parse the local part of the email address to identify a person's name; and wherein while determining the domain, the identifier-parsing module is further configured to parse the domain part of the email address to identify a name of an organization.

17. The apparatus of claim 16, wherein while obtaining the one or more Internet web pages, the content-searching module is further configured to:

generate a search query based on the person's name and the organization's name;

perform a search for a plurality of Internet web pages that satisfy the search query; and select, from a subset of the Internet web pages, a web page associated with a domain from a predetermined list of target domains.

18. The apparatus of claim 16, wherein parsing the local part of the email address involves one or more of:

selecting a substring before a period to obtain a first name;

selecting a substring after a period to obtain a last name;

removing a trailing character to obtain a first name; and removing a leading character to obtain a last name.

19. The apparatus of claim 16, wherein while generating the profile, the profile-generating module is further configured to:

determine a plurality of features for the target entity using information from the obtained Web pages;

generate a score for one or more behavior characteristics based on the identified features; and update a profile for the target entity based on the scores for the behavior characteristics.

\* \* \* \* \*